(12) United States Patent
Baldwin

(10) Patent No.: US 7,841,960 B2
(45) Date of Patent: Nov. 30, 2010

(54) EIGHT SPEED PLANETARY KINEMATIC ARRANGEMENT WITH TWO ROTATING CLUTCHES

(75) Inventor: Reid Alan Baldwin, Howell, MI (US)

(73) Assignee: Ford Global Technologies, Dearborn, MI (US)

( * ) Notice: Subject to any disclaimer, the term of this patent is extended or adjusted under 35 U.S.C. 154(b) by 364 days.

(21) Appl. No.: 12/050,658

(22) Filed: Mar. 18, 2008

(65) Prior Publication Data

US 2009/0239699 A1  Sep. 24, 2009

(51) Int. Cl.
F16H 3/44 (2006.01)
(52) U.S. Cl. .................. 475/280; 475/282; 475/288
(58) Field of Classification Search .............. 475/271, 475/275–291
See application file for complete search history.

(56) References Cited

U.S. PATENT DOCUMENTS

| | | | | |
|---|---|---|---|---|
| 3,863,524 | A * | 2/1975 | Mori et al. ................. | 475/278 |
| 4,446,758 | A * | 5/1984 | Winzeler et al. ............ | 475/276 |
| 5,885,184 | A * | 3/1999 | Park ........................... | 475/286 |
| 5,928,102 | A * | 7/1999 | Park ........................... | 475/286 |
| 5,944,629 | A * | 8/1999 | Park ........................... | 475/279 |
| 5,954,613 | A * | 9/1999 | Park ........................... | 475/275 |
| 5,980,418 | A * | 11/1999 | Park ........................... | 475/275 |
| 5,989,148 | A * | 11/1999 | Park ........................... | 475/284 |
| 6,039,670 | A * | 3/2000 | Park ........................... | 475/275 |
| 6,176,803 | B1 | 1/2001 | Meyer | |
| 6,634,980 | B1 * | 10/2003 | Ziemer ....................... | 475/275 |
| 6,752,738 | B1 | 6/2004 | Martin et al. | |
| 6,995,627 | B2 | 10/2005 | Thomas et al. | |
| 6,960,149 | B2 | 11/2005 | Ziemer | |
| 6,991,578 | B2 | 1/2006 | Ziemer | |
| 7,018,319 | B2 | 3/2006 | Ziemer | |
| 7,101,305 | B2 | 9/2006 | Tabata et al. | |
| 7,118,509 | B2 | 10/2006 | Tabata et al. | |
| 7,163,484 | B2 | 1/2007 | Klemen | |
| 7,204,780 | B2 | 4/2007 | Klemen | |
| 7,220,210 | B2 | 5/2007 | Soh | |
| 7,226,381 | B2 | 6/2007 | Klemen | |
| 7,267,630 | B2 | 9/2007 | Tabata et al. | |
| 7,276,011 | B2 | 10/2007 | Tabata et al. | |
| 7,416,509 | B1 * | 8/2008 | Carey et al. ................. | 475/275 |
| 7,695,394 | B2 * | 4/2010 | Phillips et al. .............. | 475/275 |
| 7,699,741 | B2 * | 4/2010 | Hart et al. ................... | 475/271 |
| 7,704,181 | B2 * | 4/2010 | Phillips et al. .............. | 475/275 |
| 2007/0072732 | A1 | 3/2007 | Klemen | |
| 2007/0202982 | A1 | 8/2007 | Gumpoltsberger | |
| 2007/0207891 | A1 | 9/2007 | Gumpoltsberger | |
| 2007/0213168 | A1 | 9/2007 | Gumpoltsberger | |
| 2007/0225108 | A1 | 9/2007 | Kamm et al. | |
| 2007/0225109 | A1 | 9/2007 | Jang | |
| 2007/0232438 | A1 | 10/2007 | Kamm et al. | |
| 2007/0232439 | A1 | 10/2007 | Kamm et al. | |

(Continued)

*Primary Examiner*—David D Le
*Assistant Examiner*—Derek D Knight
(74) *Attorney, Agent, or Firm*—David B. Kelley

(57) ABSTRACT

A multiple speed power transmission comprising: four epicyclic gearing assemblies each having first, second, and third rotating elements with specified interconnections, an input shaft connected to one of the rotating elements, an output shaft, two rotating clutches releasably connecting the input shaft to rotating elements, and four brakes selectively holding rotating elements against rotation. Clutches and brakes are applied in combinations of two to produce eight forward ratios and one reverse ratio.

20 Claims, 4 Drawing Sheets

U.S. PATENT DOCUMENTS

| | | |
|---|---|---|
| 2007/0238573 A1 | 10/2007 | Kamm et al. |
| 2007/0270276 A1 | 11/2007 | Kamm et al. |
| 2007/0281820 A1 | 12/2007 | Kamm et al. |
| 2007/0287573 A1 | 12/2007 | Kamm et al. |
| 2008/0261758 A1* | 10/2008 | Hart et al. .................. 475/276 |
| 2009/0011891 A1* | 1/2009 | Phillips et al. .............. 475/275 |
| 2009/0017971 A1* | 1/2009 | Phillips et al. .............. 475/276 |
| 2009/0023540 A1* | 1/2009 | Hart et al. ................... 475/276 |
| 2009/0048059 A1* | 2/2009 | Phillips et al. .............. 475/275 |

* cited by examiner

| Gear Number | Description | Number of teeth |
|---|---|---|
| 22 | 1st Sun | 63 |
| 24 | 1st Ring | 95 |
| 28 | 1st Planet | 16 |
| 32 | 2nd Sun | 23 |
| 34 | 2nd Ring | 51 |
| 38 | 2nd Planet | 14 |
| 42 | 3rd Sun | 23 |
| 44 | 3rd Ring | 51 |
| 48 | 3rd Planet | 14 |
| 52 | 4th Sun | 77 |
| 54 | 4th Ring | 25 |
| 58 | 4th Planet | 26 |

| Ratio # | Clutch 60 | Clutch 62 | Brake 64 | Brake 66 | Brake 68 | Brake 70 / OWC 72 | Speed Ratio | Step Size |
|---|---|---|---|---|---|---|---|---|
| Reverse | X | | | | | X | -3.786 | 89% |
| 1st | | | | X | | X | 4.262 | |
| | | | | | | | | 1.56 |
| 2nd | | | | X | X | | 2.734 | |
| | | | | | | | | 1.25 |
| 3rd | | | X | X | | | 2.185 | |
| | | | | | | | | 1.27 |
| 4th | X | | | X | | | 1.714 | |
| | | | | | | | | 1.29 |
| 5th | | X | | X | | | 1.325 | |
| | | | | | | | | 1.32 |
| 6th | X | X | | | | | 1.000 | |
| | | | | | | | | 1.18 |
| 7th | | X | X | | | | 0.848 | |
| | | | | | | | | 1.23 |
| 8th | | X | | | X | | 0.689 | |

Fig. 3

EIGHT SPEED PLANETARY KINEMATIC ARRANGEMENT WITH TWO ROTATING CLUTCHES

BACKGROUND OF THE INVENTION

This invention relates to the field of automatic transmissions for motor vehicles. More particularly, the invention pertains to a kinematic arrangement of gearing, clutches, brakes, and the interconnections among them in a power transmission.

BRIEF DESCRIPTION OF THE DRAWINGS

FIG. 3 is a table indicating the states of the clutches and resulting speed ratio of the transmission in FIG. 1 when the gears have the number of teeth indicated in FIG. 2.

DETAILED DESCRIPTION OF THE INVENTION

Figures 1, 2:
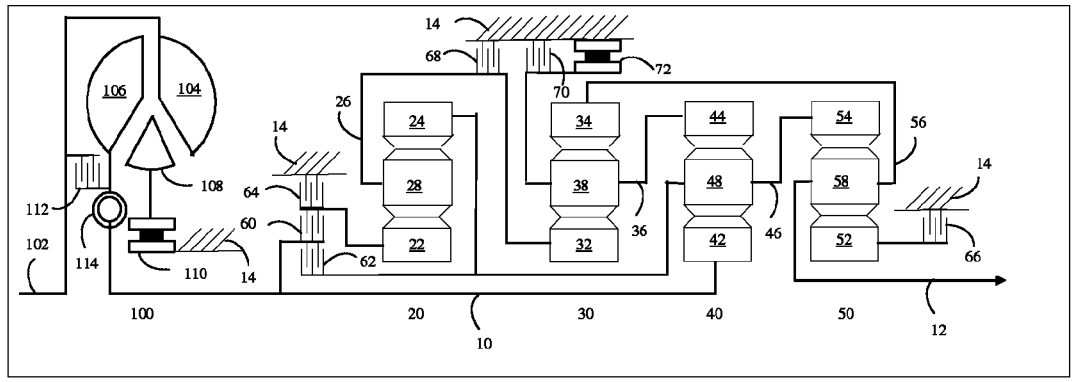
FIG. 1 is a schematic diagram of a transmission according to a first embodiment of the present invention which produces eight forward and one reverse speed ratios.
FIG. 2 is a table showing the proposed tooth numbers for the gears of the transmission illustrated in FIG. 1.

A transmission according to a first embodiment of the present invention is illustrated in FIG. 1. The transmission contains four simple planetary gear set assemblies 20, 30, 40, and 50. Each simple planetary gear set assembly has a sun gear, a ring gear with an internal mesh, a planet carrier, and a set of planet gears supported for rotation on the carrier and meshing with both the sun gear and ring gear. A recommended number of gear teeth for each of these gears is shown in FIG. 2.

Gearbox input shaft 10 is driven by the vehicle's engine via torque converter assembly 100. The third sun gear 42, is fixed to gearbox input shaft 10. The first carrier 26 is connected to the second sun gear 32. The second carrier 36 is connected to the third ring gear 44. The first ring gear 24, third carrier 46, and fourth ring gear 54 are mutually connected. A gearbox output shaft 12 drives the vehicle wheels, preferably via a driveshaft, a differential assembly, and rear axle shafts. Gearbox output shaft 12 is fixed to the fourth carrier 56 and the second ring gear 34. A transmission case 14 provides support for the gear sets, input shaft, and output shaft.

Clutches 60 and 62 and brakes 64, 66, 68, and 70 are preferably hydraulically actuated friction clutches which releasably connect two elements when hydraulic pressure is applied and disconnect those elements when the hydraulic pressure is released. Clutch 60 releasably connects gearbox input shaft 10 to the first sun gear 22. Clutch 62 releasably connects gearbox input shaft 10 to the first ring gear 24, third carrier 46, and fourth ring gear 54. Brake 64 releasably connects the first sun gear 22 to the transmission case 14. Brake 66 releasably connects the fourth sun gear 52 to the transmission case 14. Brake 68 releasably connects the first carrier 26 and second sun gear 32 to the transmission case 14. Brake 70 releasably connects the second carrier 36 and the third ring gear 44 to the transmission case 14. One way clutch 72 is a passive device which allows the second carrier 36 and third ring gear 44 to rotate freely in a positive direction but prevents rotation in the opposite direction.

Torque converter assembly 100 comprises an impeller 104 that is driven by the transmission input shaft 102, stator 108, and turbine 106. The stator 108 is connected to the transmission case 14 by a one way clutch 110. When the turbine is substantially slower than the impeller, the one way clutch holds the stator stationary and it provides a reaction torque to create torque multiplication between the impeller and turbine. The one way clutch overruns when the turbine speed is near or greater than the impeller speed. Lock-up clutch 112 connects the turbine to the impeller eliminating the hydrodynamic losses of the torque converter. In FIG. 1, the turbine is connected to gearbox input shaft 12 via a spring 114. This spring isolates the gearbox and driveline from the torque pulses produced by the engine while transmitting the average torque. A torque converter assembly with a spring in this location is commonly called a turbine damper.

The transmission ratio is selected by applying hydraulic pressure to two of the clutches and brakes as indicated in FIG. 3.

The transmission is prepared for forward motion in first gear by applying brake 66. While the vehicle is at rest, turbine 106, gearbox input shaft 10, and all gear set components are stationary. The engine drives impeller 104, which circulates fluid toroidally among the impeller, stator, and turbine. This fluid flow pattern produces a torque on the turbine shaft and gearbox input shaft 10. One way clutch 72 provides a reaction at ring gear 44. Clutch 66 provides another reaction at sun gear 52. Thus, a multiple of the input torque is transferred to output shaft 12, accelerating the vehicle.

In this condition, one way clutch 72 will overrun if an attempt is made to transmit power in the opposite direction. If engine braking behavior is desired, it is necessary to also apply friction brake 70. Optionally, one way clutch 72 may be omitted and friction brake 70 applied for both directions of power transfer.

Lock-up clutch 112 may be applied any time the speed of gearbox input shaft 10 is within the engine's operating range. Preferably, it is applied as soon as possible and remains engaged as long as possible in order to minimize transmission parasitic losses.

To shift to second gear, brake 68 is progressively engaged, maintaining brake 66 fully applied. As the torque capacity of brake 68 increases, one way clutch 72 will overrun. If one way clutch 72 is omitted, brake 70 must be progressively released as brake 68 is engaged.

To shift from second to third gear, brake 64 is progressively engaged while brake 68 is progressively released. To shift from third to fourth gear, clutch 60 is progressively engaged while brake 64 is progressively released. To shift from fourth to fifth gear, clutch 62 is progressively engaged while clutch 60 is progressively released. Brake 66 is maintained in the fully applied state through all of these transitions.

To shift from fifth to sixth gear, clutch 60 is progressively engaged while brake 66 is progressively released. Sixth gear is a direct drive gear. To shift from sixth to seventh gear, brake 64 is progressively engaged while clutch 60 is progressively released. To shift from seventh to eighth gear, brake 68 is progressively engaged while brake 64 is progressively released. Clutch 62 is maintained in the fully applied state through all of these transitions.

Downshifting to a lower gear is accomplished by reversing the steps described above for the corresponding upshift.

The transmission is operated in reverse by applying clutch 60 and brake 70.

Figure 4:
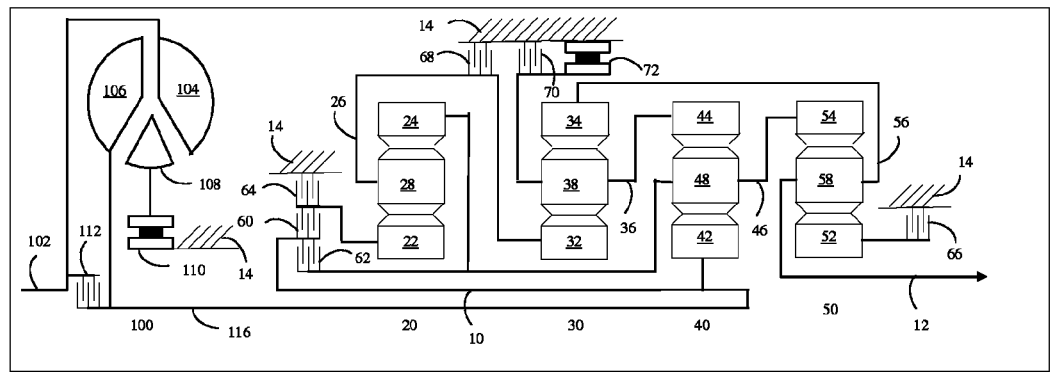
FIGS. 4-6 are schematic diagrams of alternative embodiments which differ from the embodiment of FIG. 1 with respect to the structure of the torque converter assembly.
Figure 5:
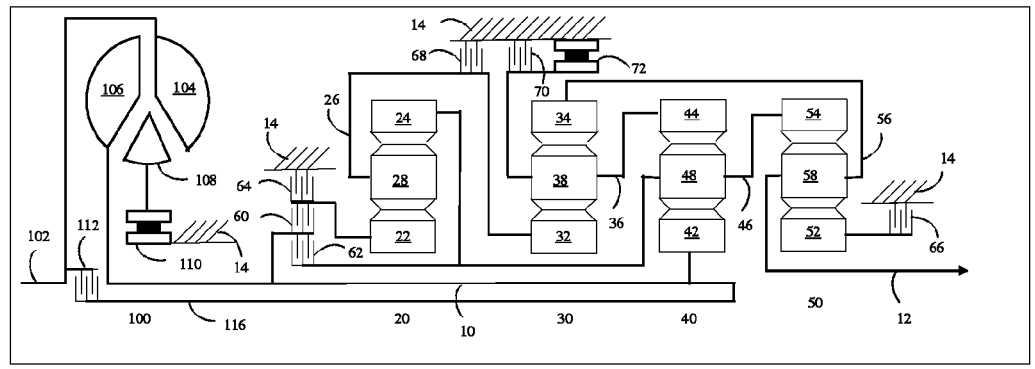
Figure 6:
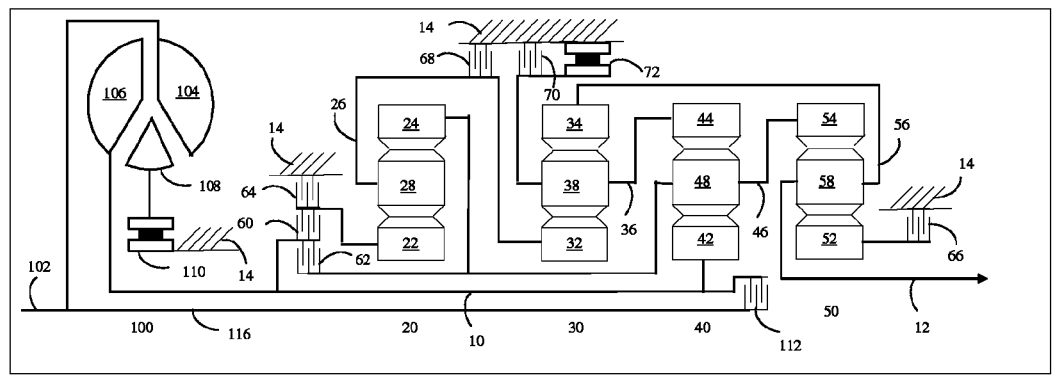

FIGS. 4, 5, and 6 illustrate alternate embodiments that differ from the above embodiment with respect to the construction and function of torque converter assembly 100. These embodiments are operated in the same fashion as the previous embodiment.

In the embodiment of FIG. 4, a relatively narrow shaft 116 runs through the center of the gearbox inside gearbox input shaft 10, which is hollow. Shafts 116 and 10 are connected to each other as far from the input end of the transmission as feasible. The diameter of shaft 116 is selected just large enough to withstand the maximum anticipated turbine torque (with an appropriate safety factor). As a result of its small diameter and relatively long length, shaft 116 has considerable torsional compliance and provides isolation from engine pulses (which was accomplished by spring 114 in the embodiment of FIG. 1). In this embodiment, turbine 106 is connected to shaft 116 as opposed to shaft 10. The remaining components and their interconnections are identical to the embodiment of FIG. 1.

The embodiment of FIG. 5 also uses a narrow shaft 116 to provide isolation from engine pulses. In this embodiment, however, the turbine is connected to gearbox input shaft 10 and lock-up clutch 112 releasably connects transmission input shaft 102 to shaft 116. Shaft 116 may be designed to withstand engine torque as opposed to turbine torque which is typically much higher. As a result, it has more compliance and provides better isolation.

In the embodiment of FIG. 6, lock-up clutch 112 is located within the gearbox portion and releasably connects the narrow shaft 116 to gearbox input shaft 10. Turbine 106 is connected to gearbox input shaft 10. Shaft 116 is connected to transmission input shaft 102. The fluid that actuates clutch 112 may be fed through output shaft 12.

Figure 7:
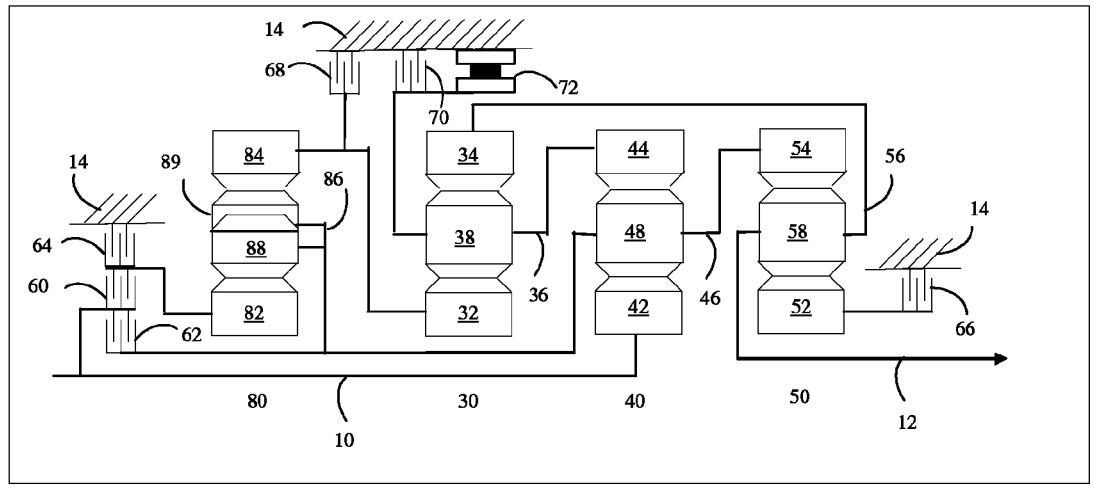
FIGS. 7-8 are schematic diagrams of alternative embodiments which differ from the embodiment of FIG. 1 with respect to the structure of the first planetary gear set and its connections to other components.
Figure 8:
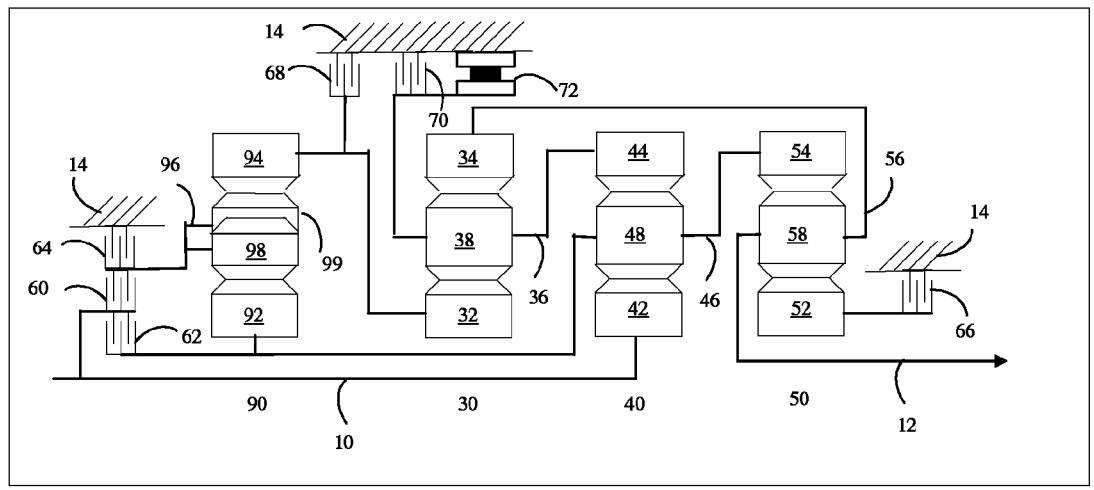

FIGS. 7 and 8 illustrate alternate embodiments which differ with respect to the previous embodiments with respect to the construction of the first gear set and its connections. Torque converter assembly 100 is not shown in these Figures. Any of the variations of torque converter illustrated in FIGS. 1, 4, 5, and 6 and described above could be utilized with the gearbox structures illustrated in FIGS. 7 and 8. The embodiments illustrated in FIGS. 7 and 8 are operated in the same fashion as the embodiment illustrated in FIG. 1 which is described above.

A transmission according to another embodiment of the present invention is illustrated in FIG. 7. The transmission contains one compound planetary gear set assembly 80 and three simple planetary gear set assemblies 30, 40, and 50. The compound planetary gear set assembly has a sun gear, a ring gear with an internal mesh, a planet carrier, an inner set of planet gears supported for rotation on the carrier and meshing with the sun gear, and an outer set of planet gears supported for rotation on the carrier and meshing with both one of the inner planet gears and the ring gear.

The third sun gear 42, is fixed to gearbox input shaft 10. The first ring gear 84 is connected to the second sun gear 32. The second carrier 36 is connected to the third ring gear 44. The first carrier 86, third carrier 46, and fourth ring gear 54 are mutually connected. Output shaft 12 is fixed to the fourth carrier 56 and the second ring gear 34. A transmission case 14 provides support for the gear sets, input shaft, and output shaft.

Clutch 60 releasably connects gearbox input shaft 10 to the first sun gear 82. Clutch 62 releasably connects gearbox input shaft 10 to the first carrier 86, third carrier 46, and fourth ring gear 54. Brake 64 releasably connects the first sun gear 82 to the transmission case 14. Brake 66 releasably connects the fourth sun gear 52 to the transmission case 14. Brake 68 releasably connects the first ring gear 84 and second sun gear 32 to the transmission case 14. Brake 70 releasably connects the second carrier 38 and the third ring gear 44 to the transmission case 14. One way clutch 72 allows the second carrier 36 and third ring gear 44 to rotate freely in a positive direction but prevents rotation in the opposite direction.

A transmission according to another embodiment of the present invention is illustrated in FIG. 8. The transmission contains one compound planetary gear set assembly 90 and three simple planetary gear set assemblies 30, 40, and 50. The third sun gear 42, is fixed to gearbox input shaft 10. The first ring gear 94 is connected to the second sun gear 32. The second carrier 36 is connected to the third ring gear 44. The first sun gear 92, third carrier 46, and fourth ring gear 54 are mutually connected. Output shaft 12 is fixed to the fourth carrier 56 and the second ring gear 34. A transmission case 14 provides support for the gear sets, input shaft, and output shaft.

Clutch 60 releasably connects gearbox input shaft 10 to the first carrier 96. Clutch 62 releasably connects gearbox input shaft 10 to the first sun gear 92, third carrier 46, and fourth ring gear 54. Brake 64 releasably connects the first carrier 96 to the transmission case 14. Brake 66 releasably connects the fourth sun gear 52 to the transmission case 14. Brake 68 releasably connects the first ring gear 94 and second sun gear 32 to the transmission case 14. Brake 70 releasably connects the second carrier 38 and the third ring gear 44 to the transmission case 14. One way clutch 72 allows the second carrier 36 and third ring gear 44 to rotate freely in a positive direction but prevents rotation in the opposite direction.

A transmission embodiment according to this invention contain four epicyclic gearing assemblies, each with three members that rotate around a common axis. In each epicyclic gearing assembly, the speeds of the three elements are linearly related. The second rotating elements is constrained to rotate at a speed which is a weighted average of the speeds of the first and third elements. The weighting factors are determined by the configuration of the epicyclic gearing assembly and the ratios of the numbers of gear teeth. In FIG. 1, all four epicyclic gearing assemblies are simple planetary gearsets. In FIGS. 7 and 8, one of the epicyclic gearing assemblies is a compound planetary gearset. Other types of epicyclic gearing assemblies, such as coplanar gear loops as described in U.S. Pat. Nos. 5,030,184 and 6,126,566, are known and may be substituted without departing from the present invention.

In accordance with the provisions of the patent statutes, the preferred embodiment has been described. However, it should be noted that alternate embodiments can be practiced otherwise than as specifically illustrated and described.

What is claimed is:

1. A multiple speed power transmission, comprising:
   first (20, 80, or 90), second (30), third (40), and fourth (50) epicyclic gearing assemblies each comprising first, second, and third rotating elements, wherein:
      the second rotating element of the first epicyclic gearing assembly (26, 84, or 94) is connected to the first rotating element of the second epicyclic gearing assembly (32);
      the second rotating element of the second epicyclic gearing assembly (36) is connected to the third rotating element of the third epicyclic gearing assembly (44); and
      the third rotating element of the first epicyclic gearing assembly (24, 86, or 92), the second rotating element of the third epicyclic gearing assembly (46), and the third rotating element of the fourth epicyclic gearing assembly (54) are mutually connected;

a gearbox input shaft (10) connected to the first rotating element of the third epicyclic gearing assembly (42); and an output shaft (12) connected to the third rotating element of the second epicyclic gearing assembly (34) and the second rotating element of the fourth epicyclic gearing assembly (56).

2. A multiple speed power transmission, comprising:

first (20, 80, or 90), second (30), third (40), and fourth (50) epicylic gearing assemblies each comprising first, second, and third rotating elements, wherein:

the second rotating element of the first epicyclic gearing assembly (26, 84, or 94) is connected to the first rotating element of the second epicyclic gearing assembly (32);

the second rotating element of the second epicyclic gearing assembly (36) is connected to the third rotating element of the third epicyclic gearing assembly (44); and the third rotating element of the first epicyclic gearing assembly (24, 86, or 92), the second rotating element of the third epicyclic gearing assembly (46), and the third rotating element of the fourth epicyclic gearing assembly (54) are mutually connected;

a gearbox input shaft (10) connected to the first rotating element of the third epicyclic gearing assembly (42);

an output shaft (12) connected to the third rotating element of the second epicyclic gearing assembly (34) and the second rotating element of the fourth epicyclic gearing assembly (56);

a first clutch (60) for releasably connecting gearbox input shaft (10) to the first rotating element of the first epicyclic gearing assembly (22, 82, or 96);

a second clutch (62) for releasably connecting gearbox input shaft (10) to the third rotating element of the first epicyclic gearing assembly (24, 86, or 92), the second rotating element of the third epicyclic gearing assembly (46), and the third rotating element of the fourth epicyclic gearing assembly (54);

a first brake (64) for selectively holding against rotation the first rotating element of the first epicyclic gearing assembly (22, 82, or 96);

a second brake (66) for selectively holding against rotation the first rotating element of the fourth epicyclic gearing assembly (52); and a third brake (70, 72) for selectively holding against rotation the second rotating element of the second epicyclic gearing assembly (36) and the third rotating element of the third epicyclic gearing assembly (44).

3. The multiple speed power transmission of claim 2, further comprising:

a fourth brake (68) for selectively holding against rotation the second rotating element of the first epicyclic gearing assembly (26, 84, or 94) and the first rotating element of the second epicyclic gearing assembly (32).

4. The multiple speed power transmission of claim 2, wherein the first epicyclic gearing assembly (20) is a simple planetary gear set comprising:

a sun gear (22) as the first rotating element;
a planet carrier (26) as the second rotating element;
a ring gear (24) as the third rotating element; and
a set of planet gears (28) supported for rotation on the planet carrier and in meshing engagement with both the sun gear and the ring gear.

5. The multiple speed power transmission of claim 2, wherein the second epicyclic gearing assembly (30) is a simple planetary gear set comprising:

a sun gear (32) as the first rotating element;
a planet carrier (36) as the second rotating element;
a ring gear (34) as the third rotating element; and
a set of planet gears (38) supported for rotation on the planet carrier and in meshing engagement with both the sun gear and the ring gear.

6. The multiple speed power transmission of claim 2, wherein the third epicyclic gearing assembly (40) is a simple planetary gear set comprising:

a sun gear (42) as the first rotating element;
a planet carrier (46) as the second rotating element;
a ring gear (44) as the third rotating element; and
a set of planet gears (48) supported for rotation on the planet carrier and in meshing engagement with both the sun gear and the ring gear.

7. The multiple speed power transmission of claim 2, wherein the fourth epicyclic gearing assembly (50) is a simple planetary gear set comprising:

a sun gear (52) as the first rotating element;
a planet carrier (56) as the second rotating element;
a ring gear (54) as the third rotating element; and
a set of planet gears (58) supported for rotation on the planet carrier and in meshing engagement with both the sun gear and the ring gear.

8. The multiple speed power transmission of claim 2, wherein the first epicyclic gearing assembly (80) is a compound planetary gear set comprising:

a sun gear (82) as the first rotating element;
a planet carrier (86) as the third rotating element;
a ring gear (84) as the second rotating element;
a set of inner planet gears (88) supported for rotation on the planet carrier and in meshing engagement with the sun gear; and
a set of outer planet gears (89) supported for rotation on the planet carrier and in meshing engagement with both the ring gear and the inner planet gears.

9. The multiple speed power transmission of claim 2, wherein the first epicyclic gearing assembly (90) is a compound planetary gear set comprising:

a sun gear (92) as the third rotating element;
a planet carrier (96) as the first rotating element;
a ring gear (94) as the second rotating element;
a set of inner planet gears (98) supported for rotation on the planet carrier and in meshing engagement with the sun gear; and
a set of outer planet gears (99) supported for rotation on the planet carrier and in meshing engagement with both the ring gear and the inner planet gears.

10. The multiple speed power transmission of claim 2, wherein the third brake comprises:

a friction brake (70); and
a one way clutch (72).

11. The multiple speed power transmission of claim 2, further comprising a fluid coupling or torque converter having:

an impeller (104) driven by an external power source;
a turbine (106) driven hydro-dynamically by the impeller;
a torsional isolator (114 or 116) connecting the turbine to the gearbox input shaft (10) while providing torsional compliance; and
a third clutch for releasably connecting the turbine to the impeller.

12. The multiple speed power transmission of claim 11, wherein:

the gearbox input shaft (10) is hollow; and
the torsional isolator (116) comprises a narrow shaft located inside the gearbox input shaft.

13. The multiple speed power transmission of claim 2, further comprising a fluid coupling or torque converter having:
   an impeller (104) driven by an external power source; and
   a turbine (106) driven hydro-dynamically by the impeller and connected to the gearbox input shaft (10).

14. The multiple speed power transmission of claim 13, further comprising:
   a narrow shaft (116) located inside and connected to the gearbox input shaft (10); and
   a third clutch (112) for releasably connecting the external power source to the narrow shaft.

15. The multiple speed power transmission of claim 13, further comprising:
   a narrow shaft (116) located inside the gearbox input shaft (10) and connected to the external power source; and
   a third clutch (112) for releasably connecting the gearbox input shaft (10) to the narrow shaft.

16. A multiple speed power transmission, comprising:
   first (20), second (30), third (40), and fourth (50) planetary gear sets each comprising a sun gear, a ring gear, a planet carrier, and a set of pinion gears supported on the planet carrier and meshing with both the sun gear and ring gear, wherein:
      the carrier of the first planetary gear set (26) is connected to the sun gear of the second planetary gear set (32);
      the planet carrier of the second planetary gear set (36) is connected to the ring gear of the third planetary gear set (44); and
      the ring gear of the first planetary gear set (24), the planet carrier of the third planetary gear set (46), and the ring gear of the fourth planetary gear set (54) are mutually connected;
   a gearbox input shaft (10) connected to the sun gear of the third planetary gear set (42); and
   an output shaft (12) connected to the ring gear of the second planetary gear set (34) and the planet carrier of the fourth planetary gear set (56).

17. The multiple speed power transmission of claim 16, further comprising:
   a first clutch (60) for releasably connecting the gearbox input shaft (10) to the sun gear of the first planetary gear set (22);
   a second clutch (62) for releasably connecting the gearbox input shaft (10) to the ring gear of the first planetary gear set (24), the planet carrier of the third planetary gear set (46), and the ring gear of the fourth planetary gear set (54);
   a first brake (64) for selectively holding against rotation the sun gear of the first planetary gear set (22);
   a second brake (66) for selectively holding against rotation the sun gear of the fourth planetary gear set (52); and
   a third brake (70, 72) for selectively holding against rotation the planet carrier of the second planetary gear set (36) and the ring gear of the third planetary gear set (44); and
   a fourth brake (68) for selectively holding against rotation the planet carrier of the first planetary gear set (26) and the sun gear of the second planetary gear set (32).

18. A multiple speed power transmission, comprising:
   a first planetary gear set (80 or 90) comprising a sun gear (82 or 92), a ring gear (84 or 94), a planet carrier (86 or 96), an inner set of planet gears (88 or 98) meshing with the sun gear, and an outer set of pinion gears (89 or 99) meshing with both the inner planet gears and ring gear;
   second (30), third (40), and fourth (50) planetary gear sets each comprising a sun gear, a ring gear, a planet carrier, and a set of pinion gears supported on the planet carrier and meshing with both the sun gear and ring gear, wherein:
      the ring gear of the first planetary gear set (84 or 94) is connected to the sun gear of the second planetary gear set (32);
      the planet carrier of the second planetary gear set (36) is connected to the ring gear of the third planetary gear set (44); and
      the planet carrier of the third planetary gear set (46), is connected to the ring gear of the fourth planetary gear set (54);
   a gearbox input shaft (10) connected to the sun gear of the third planetary gear set (42);
   an output shaft (12) connected to the ring gear of the second planetary gear set (34) and the planet carrier of the fourth planetary gear set (56);
   a first brake (66) for selectively holding against rotation the sun gear of the fourth planetary gear set (52);
   a second brake (70, 72) for selectively holding against rotation the planet carrier of the second planetary gear set (36) and the ring gear of the third planetary gear set (44);
   a third brake (68) for selectively holding against rotation the ring gear of the first planetary gear set (84 or 94) and the sun gear of the second planetary gear set (32).

19. The multiple speed power transmission of claim 18, wherein the planet carrier of the planetary first gear set (86) is connected to the planet carrier of the third planetary gear set (46) and the ring gear of the fourth planetary gear set (54) and further comprising:
   a first clutch (60) for releasably connecting the gearbox input shaft (10) to the sun gear of the first planetary gear set (82);
   a second clutch (62) for releasably connecting the gearbox input shaft (10) to the planet carrier of the first planetary gear set (86); and
   a fourth brake (64) for selectively holding against rotation the sun gear of the first planetary gear set (82).

20. The multiple speed power transmission of claim 18, wherein the sun gear of the planetary first gear set (92) is connected to the planet carrier of the third planetary gear set (46) and the ring gear of the fourth planetary gear set (54) and further comprising:
   a first clutch (60) for releasably connecting the gearbox input shaft (10) to the planet carrier of the first planetary gear set (96);
   a second clutch (62) for releasably connecting the gearbox input shaft (10) to the sun gear of the first planetary gear set (92); and
   a fourth brake (64) for selectively holding against rotation the planet carrier of the first planetary gear set (96).

* * * * *